United States Patent
Saladin et al.

(10) Patent No.: US 9,018,804 B2
(45) Date of Patent: Apr. 28, 2015

(54) CONTROLLING OF A POWER STATE UNDER EXTREME TEMPERATURES

(75) Inventors: Peter Saladin, Palatine, IL (US); James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 834 days.

(21) Appl. No.: 13/075,622

(22) Filed: Mar. 30, 2011

(65) Prior Publication Data

US 2012/0254632 A1    Oct. 4, 2012

(51) Int. Cl.
| | |
|---|---|
| G06F 1/26 | (2006.01) |
| G06F 11/30 | (2006.01) |
| B60R 16/03 | (2006.01) |
| G06F 1/20 | (2006.01) |
| H02H 5/04 | (2006.01) |

(52) U.S. Cl.
CPC ............... B60R 16/03 (2013.01); G06F 1/206 (2013.01); G06F 1/266 (2013.01); H02H 5/042 (2013.01)

(58) Field of Classification Search
CPC ....................................................... B60R 16/03
USPC ........................................................ 307/116
See application file for complete search history.

(56) References Cited

U.S. PATENT DOCUMENTS

| | | | | |
|---|---|---|---|---|
| 4,567,939 A | * | 2/1986 | Dumbeck | 165/224 |
| 4,750,332 A | * | 6/1988 | Jenski et al. | 62/80 |
| 4,808,009 A | * | 2/1989 | Sittler et al. | 374/178 |
| 5,025,248 A | * | 6/1991 | Bergeron | 340/596 |
| 5,895,989 A | | 4/1999 | Imaizumi et al. | |
| 2003/0087636 A1 | * | 5/2003 | Mazzara et al. | 455/426 |
| 2003/0123206 A1 | * | 7/2003 | Gower et al. | 361/93.8 |
| 2004/0061481 A1 | * | 4/2004 | Heinrich et al. | 322/34 |
| 2008/0239608 A1 | | 10/2008 | Yoshitomi | |

FOREIGN PATENT DOCUMENTS

| | | |
|---|---|---|
| CN | 101192838 A | 6/2008 |
| DE | 3932272 A1 | 3/1990 |
| DE | 19915098 A1 | 10/2000 |
| EP | 1316876 A2 * | 6/2003 |
| EP | 2197081 A2 | 6/2010 |

OTHER PUBLICATIONS

International Search Report and Written Opinion dated May 7, 2012, from corresponding International Patent Application No. PCT/US2012/023146.

* cited by examiner

*Primary Examiner* — Jared Fureman
*Assistant Examiner* — Joel Barnett

(57) ABSTRACT

A system for controlling a network access device is provided. The system includes a processor, the network access device, and a control circuit. The processor being in communication with the network access device through a communication link. The control circuit monitoring a temperature of the network access device and activating or deactivating the network access device based on the temperature.

14 Claims, 4 Drawing Sheets

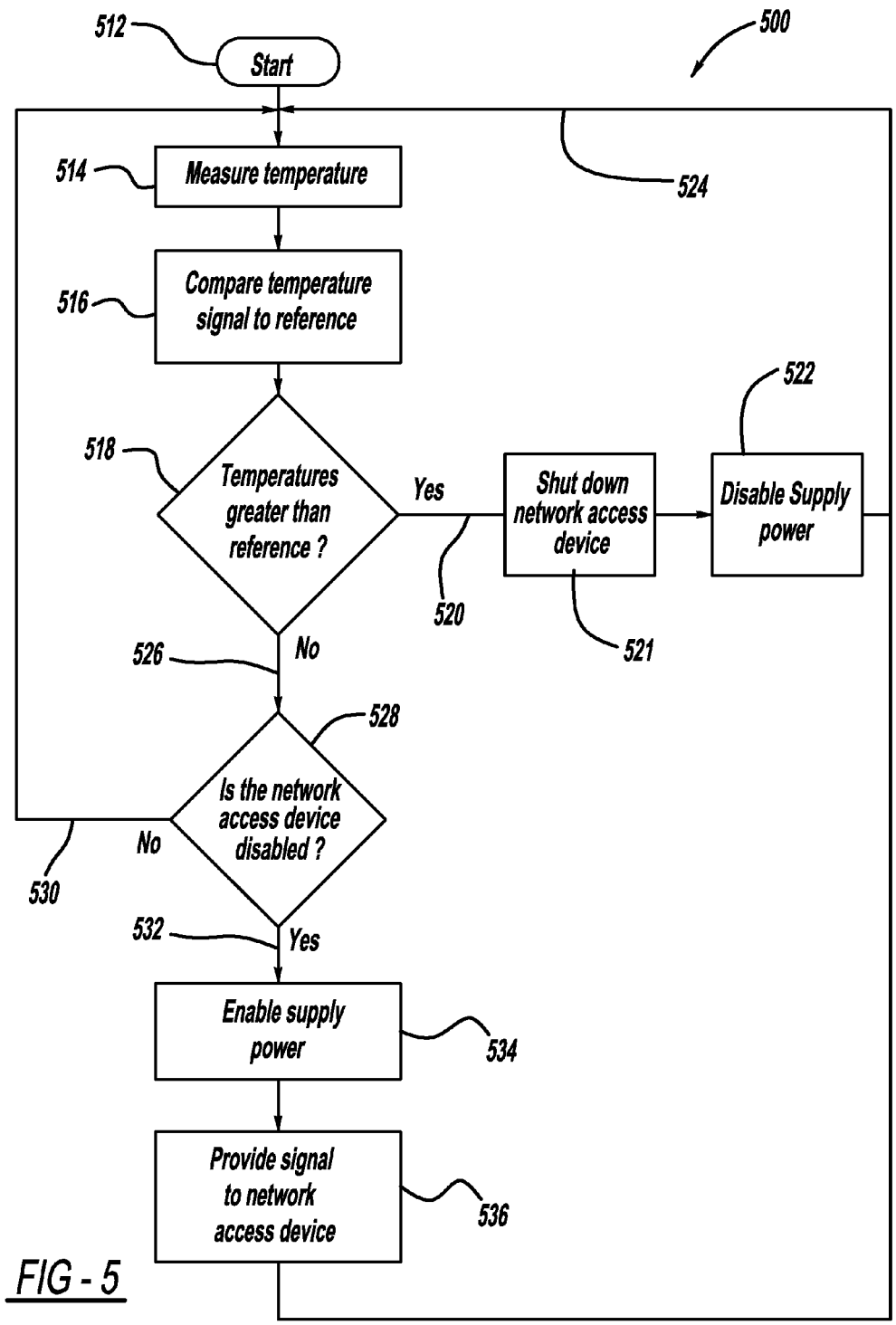

CONTROLLING OF A POWER STATE UNDER EXTREME TEMPERATURES

BACKGROUND

1. Field of the Invention

The present invention generally relates to a system for controlling supply power to a network access device.

2. Description of Related Art

Recently, the requirements for connectivity have been increased greatly. These expectations are driven by the widely available commercial products available on the market. However, many products that are available for commercial user are not capable of meeting the harsh environmental specification of automotive vehicles. As such, difficulty often exists in porting consumer technologies to automotive applications.

In view of the above, it is apparent that there exists a need for a system for controlling supply power to a network access device.

SUMMARY

In satisfying the above need, as well as overcoming the drawbacks and other limitations of the related art, the present application provides a system for controlling supply power to a network access device. The system includes a telematics controller, the network access device, and a control circuit. The telematics controller being in communication with the network access device through a communication link. The control circuit monitoring a temperature of the network access device and deactivating the network access device based on the temperature.

Commercial grade semiconductor components created for the cellular handset and modem market may be rated to a maximum temperature range of –25 to +85 deg C. ambient to the case of the device. In handset applications where these integrated circuits (ICs) are used, the operational temperature requirements of the handsets are –20 deg C. to +55 deg C. If the handset has an internal heating rise of <30 deg C., the ICs still operate within their specified temperature range. Automotive temperature requirements are more stringent than cellular handset requirements. It is preferred to have the product operate from –40 to +85 deg C. ambient at the outside of the housing. During operation, there can be a temperature rise of >20 deg C. internal to the housing. When these ICs are used in automotive applications, the temperature ambient to the ICs can be –40 to +105 deg C. which is the automotive grade II temperature range. Cellular chipset suppliers will not classify their devices as automotive grade II or guarantee performance outside the standard commercial grade temperature range, for example –25 to +85 deg C. If the cellular chipset is operated outside of its operating temperature range, performance may degrade beyond specification limits or the devices may become damaged. The component supplier may also void the warranty on the ICs under these conditions. Therefore the cellular modem can monitor its temperature and could turn itself off to protect against operating above or below its maximum rated operating temperature. The storage (unpowered) ratings for cellular chipsets are significantly wider than the operational requirements (storage ratings are normally –55 to 125 C). Thus the components can be in the automotive environment, if there is no power applied.

However, if the cellular modem powers itself off, it cannot turn itself back on when the temperature drops to a safe level because it is not able to monitor temperature. Described below are two implementations for powering on the cellular modem once a safe temperature is reached.

In one implementation a control circuit may be used. After power has been removed from the cellular modem ICs due to a high temperature condition, simple automotive or military grade components can be used to create a monitoring circuit that would trigger a turn on pulse and enable power to the cellular modem once the temperature reading is within a safe operating level for the ICs. This circuit could consist of a thermistor and a comparator for monitoring the temperature level, a switch for enabling the power supply and a timer circuit for generating the turn on pulse to power on the cellular modem. An optional delay circuit can delay the turn on pulse until the cellular modem circuitry has a stable power supply.

The algorithm for the trigger circuit is as follows: The cellular modem will be in normal operation until the temperature of the cellular modem reaches or is near its maximum operating temperature. At this time the cellular modem will power down by itself or be commanded to power down by the microprocessor. Further, the power supply to the circuit may be disabled by the control circuit. The cellular modem ICs would have no power and would only be limited by the maximum storage temperature. Once the temperature has dropped to reach a safe level, the comparator will trip, enabling the latch of the power supply and enabling the one shot to send a turn on pulse to the cellular modem, turning the modem circuitry on.

In this implementation, an optional autograde microprocessor could have the ability to disable the comparator circuit under normal temperature conditions and control the cellular modem directly.

In another implementation an automotive grade microprocessor may be used for additional control. The automotive grade microprocessor would have a higher operating temperature range than the cellular modem and could remain turned on while the cellular modem is powered off during high temperature conditions. The microprocessor would be connected to a thermistor on the cellular modem to monitor the cellular modem temperature. The microprocessor could remove the enable signal from the supply power. Further, the microprocessor can enable power to the cellular modem and provide a turn on pulse when the temperature returns to a safe level.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 5 is a flow chart illustrating a method for controlling a device based on temperature.

DETAILED DESCRIPTION

Figure 1:
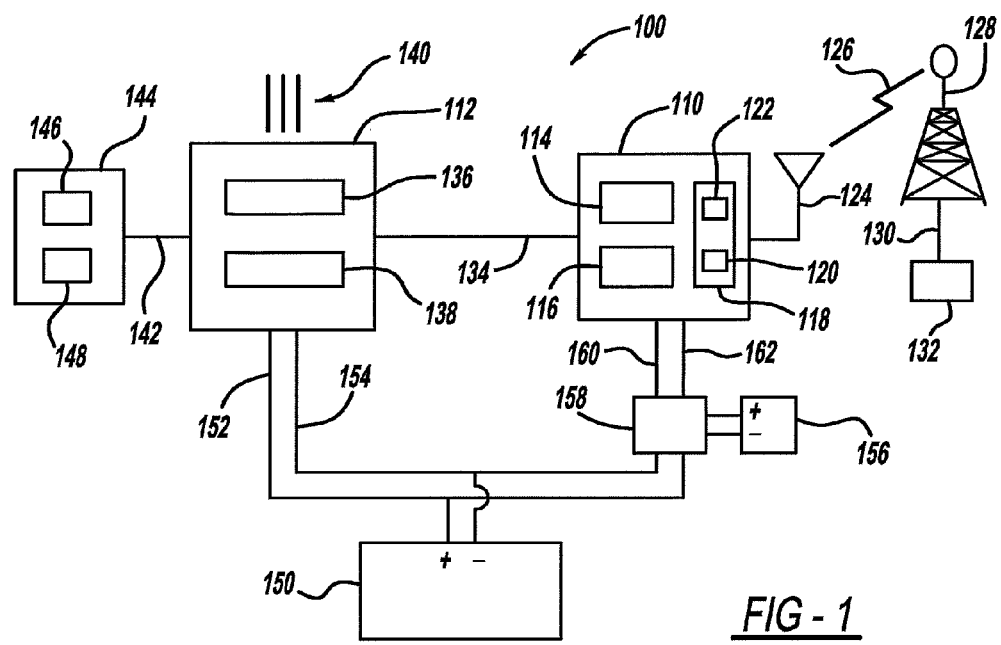
FIG. 1 is a schematic view of a system including a telematics controller and a network access device.

Now referring to FIG. 1, a system 100 is provided. The system includes a network access device 110 and a telematics controller 112. The network access device 110 may include a processor 114 and a storage device 116. The processor 114 may be a programmable microprocessor or alternatively may be an application specific integrated circuit (ASIC), or other known processor. The storage device 116 may be a memory, for example, random access memory, static memory, or other data storage device. The network access device 110 may also include a transceiver 118 which includes a transmitter 122 and a receiver 120. Alternatively, the network access device 110 may include an independent transmitter and receiver. The transceiver 118 may be in communication with an antenna 124. The transceiver 118 may communicate with a radio tower 128 as denoted by line 126. The communication 126 between the network access device 110 and the radio tower 128 may comprise one of a plurality of communication modes.

The transceiver 118 in the network access device 110 may be used for transmitting uplink communications and receiving downlink communication to and from the network 130 and service center 132 over the wireless communication link 126. The wireless communication link 126 may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications. In a further example, the transceiver 118 may be enabled using other wireless technologies such as Bluetooth technology. Bluetooth technology allows for the replacement of a wired connection by enabling devices to communicate with each other through a universal short-range radio link.

The radio tower 128 may be in communication with a service provider 132 including for example, a network server through a network 130. Network 130 may be an analog network such as a POTS or a digital network for example, Ethernet over TCPIP protocol. In other examples, the network 130 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, and the like.

The network access device 110 may be in communication with the telematics controller 112 through a communication interface 134. In some implementations the network access device 110 may be in the same package as the telematics controller 112. However, other implementations the network access device 110 may be provided in a separate package from the package of the telematics controller 112 and, therefore, may be located in a different area of the vehicle. Various information may be communicated between the telematics controller 112 and the network access device 110.

The network access device 112 may include a processor 136 and a storage device 138. The processor 136 may be a microprocessor, an application specific integrated circuit, a programmable gate array, or other processor. Further, the storage device 138 may be a memory device for example, random access memory, read only memory, static memory, or may even be a hard drive or optical drive, or other means of data storage. The telematics control 112 may be in communication with a plurality of other vehicle sensors and devices through a wire harness or over the vehicle bus as denoted by lines 140. In addition, the telematics controller 112 may be in communication with a user interface 144 as denoted by line 142. The user interface 144 may include a display 146 and controls 148 for providing user input such as vehicle parameters into the telematics controller 112. Also, the user interface 144 may include elements such as a keyboard or keypad, one or more control buttons, indicator lights, one or more speakers, a microphone, and any other user interface type elements for telematics applications and services. Optionally, the telematics controller 112 may also be connected to a positioning unit. The positioning unit could be a system that determines the geographic location of the vehicle such as a global positioning system (GPS), a dead-reckoning system, and the like.

Further, the telematics controller 112 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 112 or network access device 110 based on parameters of such systems.

The telematics controller 112 may be powered by the vehicle battery 150 as denoted by lines 152 and 154. Alternatively, a voltage converter may be provided to convert from the vehicle battery voltage to a different voltage that may be appropriate for running the telematics controller 112. The voltage converter may be included in the package for the telematics controller 112 or alternatively may be in a separate package between the vehicle battery 150 and the telematics controller 112. The vehicle battery 150 may also provide power to the network access device 110.

A circuit 158 may be included between the vehicle battery 150 and the network access device 110. The circuit 158 may include a voltage converter to change the voltage provider to the network access device 110 in lines 160 and 162. In addition, the circuit 158 may be connected to a network access device battery 156. The network access device battery 156 may be charged while the vehicle is running and may for example, be switched to provide power to the network access device 110 when power from the vehicle power system (e.g., the battery or alternator) is not available. Further, the circuit 158 may control the monitoring and periodic powering of the network access device if the vehicle is turned off for a long period of time. Further, the circuit 158 may control the charging of the network access device battery 156 at appropriate times according to the environmental variables or the expected use cycle of the vehicle.

Figure 2:
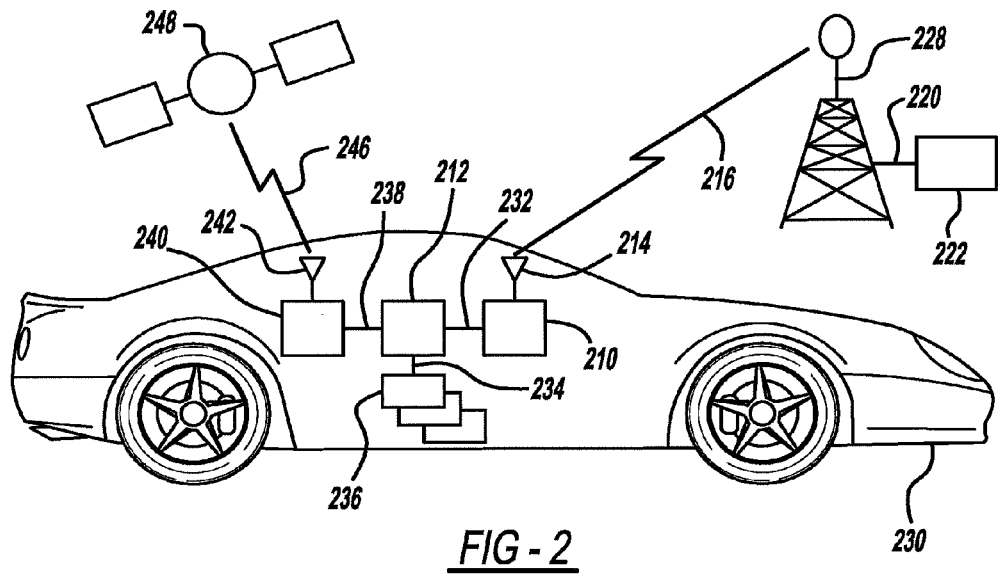
FIG. 2 is a schematic view of a system with a telematics controller and network access device implemented within a motor vehicle.

Now referring to FIG. 2, one possible implementation of the system 100 is provided within a vehicle 230. The network access device 210 may be provided in a separate package from the telematics controller 212. The network access device 210 may be connected to an antenna 214. The antenna 214 may be representative of a plurality of antennas or a matrix of antennas depending upon the particular communication mode selected. Communication of the network access device 210 is facilitated with a remote station 228 as denoted by line 216. As described previously, the remote station 228 may be in communication with a service provider 222 including a network server through a network 220. The telematics controller 212 may be in communication with a global positioning device 240 over the vehicle bus or a custom connection as denoted by line 238. The global positioning device 240, such as a satellite global positioning system (GPS), may be in communication with an antenna 242. The antenna 242 may be one of a plurality of antennas or a matrix of antennas. Further, the antenna or plurality of antennas represented by reference number 242 may be the same antennas as denoted by reference number 214. The GPS unit may be in communication with a satellite 248 as denoted by line 246. As such, the GPS unit 240 may retrieve positional data for the vehicle or in other implementations 240 may also represent a general satellite receiver and, therefore, may receive other general broadcast information or communication from the satellite 248. The telematics controller 212 may also be in communication with various other vehicle devices and systems through the vehicle bus, wire harnesses, or other wireless connections as denoted by line 234. The various other devices 236 may include but are not limited to the engine control system, the vehicle locks, the vehicle safety systems (e.g. seatbelt retractors, airbags, etc.), vehicle entertainment system, or a suspension control system.

Figure 3:
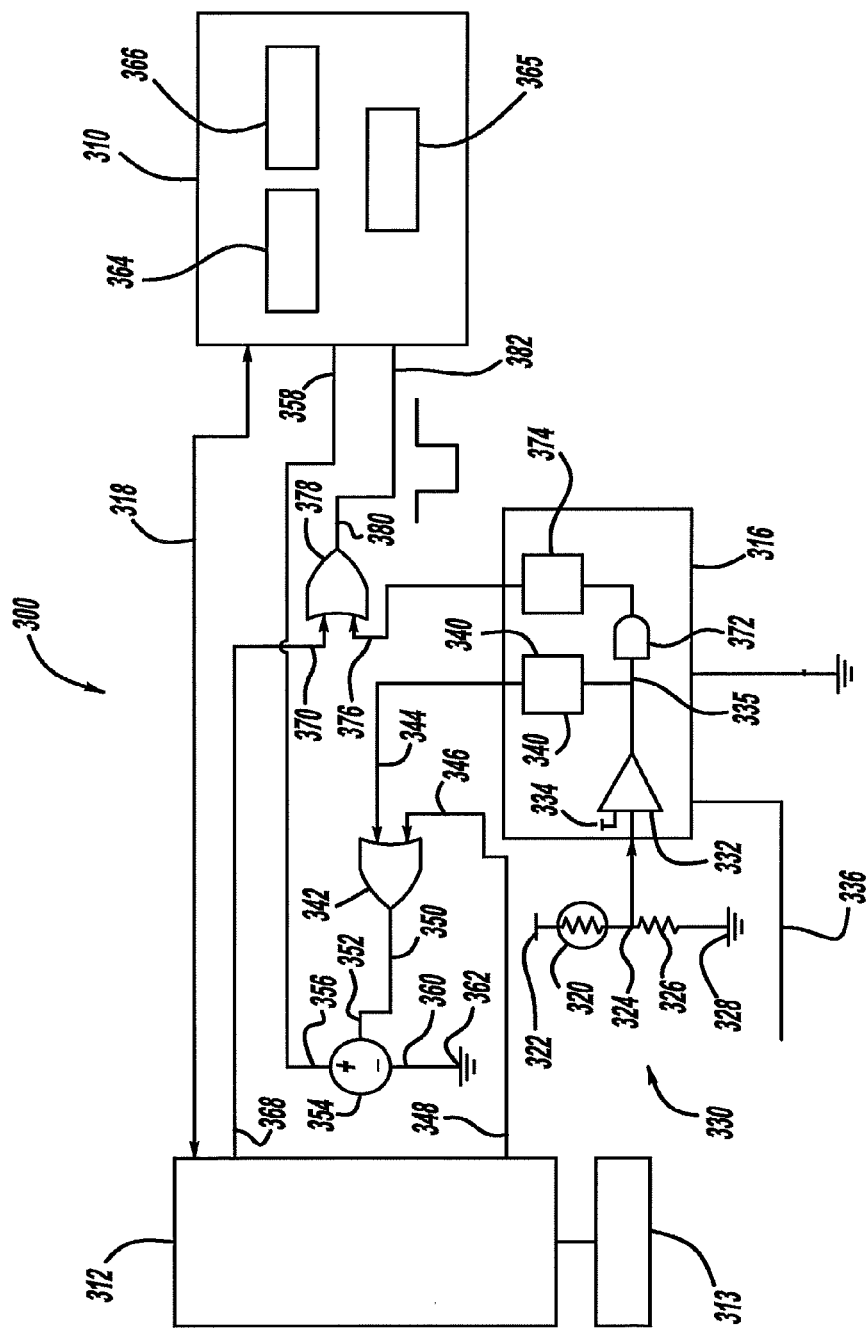
FIG. 3 is a schematic view of a system for deactivating a device based on temperature.

Now referring to FIG. 3, a system 300 is provided for controlling a network access device based on temperature. The system 300 includes a network access device 310 and a processor, for example, within a telematics controller 312. The network access device 310 may include one or more of a processor 364, a transceiver 365, and a storage device 366 or any combination thereof. The network access device 310 may communicate with the telematics controller 312 over a communication bus 318. The telematics controller 312 may be connected to a storage device, for example, memory 313. A control circuit 316 may enable or disable the network access device 310 based on temperature. A temperature sensor 320 may be attached to the network access device 310. For example, the sensor may be connected to the portion of the network access device 310 where the highest temperature is anticipated. Alternatively, the sensor 320 may be placed on a particularly sensitive component for example, a transceiver or more generally a cellular modem within the network access device. The sensor 320 may be a thermistor, however, other temperature sensors may be used.

The thermistor may form a portion of a voltage divider 330. As such, the reference voltage 322 may be provided to one side of the thermistor, while the other side of the thermistor is connected to a node 324. Further, a resistor 326 may be connected between the node 324 and an electrical reference voltage, such as an electrical ground as denoted by line 328. Accordingly, the voltage at node 324 may be provided to the control circuit 316 as a temperature signal. More specifically, the temperature signal may be provided to a comparator 332. The temperature signal may be compared to a reference voltage 334 essentially providing a threshold function for the temperature signal. The output of the comparator 332 may be provided to node 335.

In one implementation, an input of a latch 340 may be connected to node 335 and an output of latch 340 may provide a temperature enable signal 344 to a first input of an OR gate 342. Accordingly, the output of the comparator 332 is in communication with the first input of the OR gate 342 through the latch 340. A second input of the OR gate 342 may be in communication with an output 348 of the telematics controller 312 to provide a controller enable signal 346 to the OR gate 342. The OR gate 342 provides an enable signal 350 to an enable input 352 of the power supply 354, if either the first or second inputs of the OR gate 342 are enabled. Accordingly, either an affirmative temperature enable signal 344 or an affirmative controller enable signal 346 will provide the enable signal 350 to the enable input 352 of the power supply 354. A negative terminal 360 of the power supply 354 is connected to a reference voltage such as electrical ground as denoted by line 362. In addition, a positive terminal 356 of the voltage supply 354 is provided to a power input 358 of the network access device 310.

Referring again to node 335 of the control circuit 316, an input of a delay 372 may be connected to node 335. An output of delay 372 may be connected to a one shot 374. The one shot 374 then provides a temperature ON pulse 376 to a first input of OR gate 378. A second input of OR gate 378 is connected to an output 368 of the telematics controller 312. The output 368 provides a controller on pulse 370 to the second input of the OR gate 378. As such, if either the controller ON pulse 370 or the temperature on pulse 376 is received by the OR gate 378, a network access device on pulse 380 is provided to an ON input 382 of the network access device 310.

The delay 372 allows time for the power supply 354 to be enabled and provide power to the network access device 310 prior to the ON pulse 380 being initiated and provided to the network access device 310. Further, a control circuit enable/disable signal 336 may be provided to the control circuit 316. Accordingly, if an affirmative disable signal is provided to the control circuit 316, the electronics may be disabled and the temperature enable signal 344, as well as, the temperature ON pulse 376 will not be sent regardless of the status of the temperature measured by the temperature sensor 320.

Figure 4:
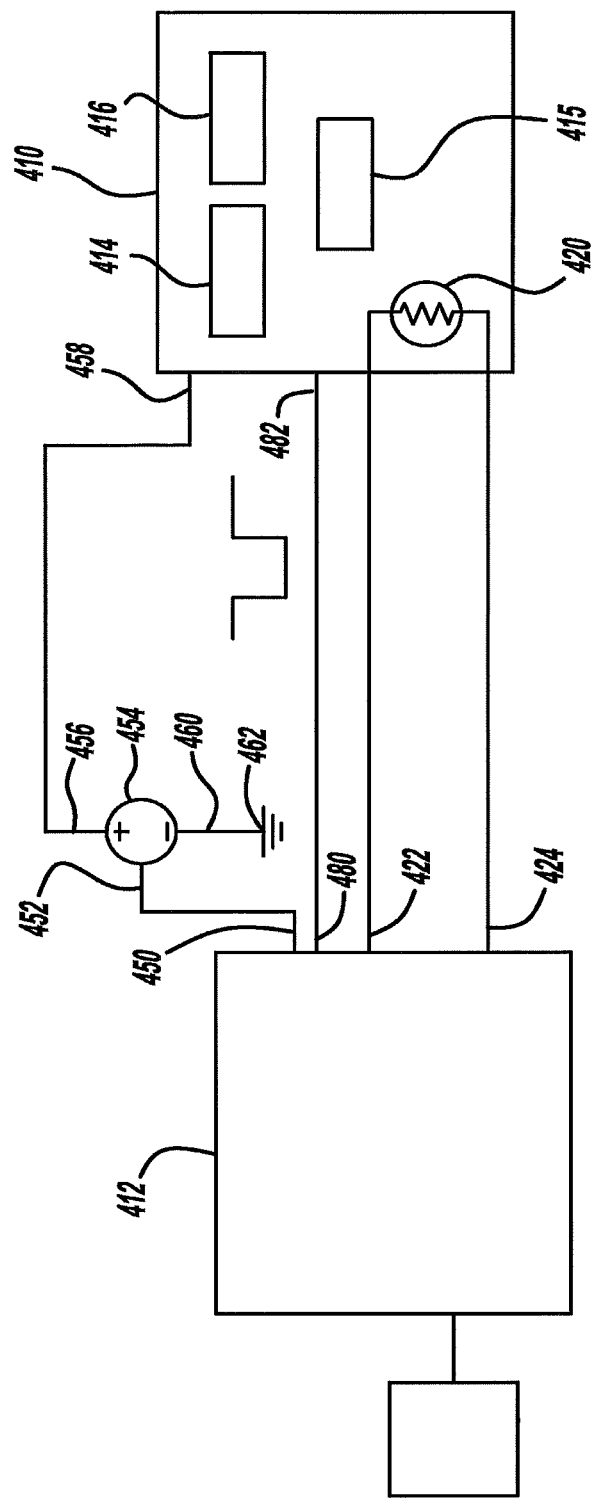
FIG. 4 is another system for deactivating a device based on temperature.

Now referring to FIG. 4, another implementation of a system for controlling a network access device is provided. The network access device 410 may include one or more of a processor 414, a transceiver 416, and storage 415, or any combination thereof. A temperature sensor 420 may be attached to the network access device 410, for example, on a location which is anticipated to have the highest temperature within the network access device or on a component which is particularly sensitive to temperature, such as a cellular modem, or more specifically a processor or transceiver. The sensor 420 may be in communication with a telematics controller 412, as denoted by lines 422 and 424. In one example, the sensor 420 is a thermistor and lines 422 and 424 measure a voltage drop across the thermistor which is provided as a temperature signal to the telematics controller 412. The telematics controller 412 may then determine an anticipated temperature based on the sensed voltage for example, using a look-up table, a function, or other known signal calibration means. Accordingly, the controller 412 may apply logic in software similar to the hardware implementation discussed above in reference to FIG. 3.

If the sensed temperature by the temperature sensor 420 moves above a temperature threshold the telematics controller 412 may provide an enable signal 450 to an enable input of 452 of the power supply 454. The negative terminal 460 of the power supply 454 may be connected to an electrical reference such as electrical ground as denoted by line 462. In addition, a positive terminal 456 of the power supply 454 may be connected to a power input 458 of the network access device 410. Shortly after power is supplied to the network access device 410, the controller 412 may provide an ON pulse 480 to an ON input 482 of the network access device. The ON pulse 480 provided to the network access device 410 activates the network access device similar to pushing an on switch on most commercial electrical devices. In a similar manner, when the temperature sensed by the temperature sensor 420 moves below a threshold temperature, the telematics controller 412 may remove the enable signal 450 from the enable input 452 thereby disabling the power supply 454 and removing power from the network access device 410.

Now referring to FIG. 5, a method is provided for controlling the network access device based on temperature. The method 500 starts in block 512. In block 514, the temperature of the network access device or components therein is measured. In block 516, the temperature signal is compared to a reference. While the reference may be indicative of temperature, the comparison may, for example, be a voltage or current signal. In block 518, if the temperature signal is greater than the reference, the method follows line 520 to block 521. In block 521, the network access device may be shut down, for example, by a power down signal from the telematics controller or due to internal monitoring of the network access device. In block 522, the power supply to the cellular modem is disabled to protect the components of the network access device. The method then follows line 524 back to block 514 where the temperature is measured again.

Referring again to block 518, if the temperature signal is not greater than the reference, the method follows line 526 to block 528. In block 528, the system determines if the network access device is disabled. If the network access device is not disabled, then the method follows line 530 to block 514 where the method continues. However, if the network access device is disabled in block 528, the method follows line 532 to block 534. In block 534, the power supply is enabled thereby providing power to the network access device. An ON signal is then provided to the network access device, as denoted by block 536. The ON signal serves to initiate the network access device once the supply power is restored. The method then follows line 524 back to block 514 where the temperature is measured again and the cycle continues.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for controlling a network access device in a vehicle comprising: a power source configured to provide electrical energy to the network access device; a temperature sensor thermally coupled to the network access device; a power control circuit coupled to the temperature sensor and coupled to the power source, the power control circuit configured to disable the power source from supplying electrical energy to the network access device responsive to a signal from the temperature sensor that indicates that a temperature of the network access device exceeds a predetermined threshold; and a processor coupled to the power source and configured to re-enable the power source after the power source is disabled by the power control circuit in order to supply electrical energy to the network access device, said processor thereby re-enabling the power source to supply electrical energy to the network access device when the signal from the temperature sensor indicates that a temperature of the network access device exceeds the predetermined threshold.

2. The system according to claim 1, wherein the control circuit comprises components with a higher temperature rating than the network access device.

3. The system according to claim 1, wherein the temperature sensor comprises a sensor attached to a semiconductor in the network access device.

4. The system according to claim 1, wherein the sensor is a thermistor.

5. The system according to claim 4, wherein thermistor forms a voltage divider.

6. The system according to claim 5, wherein a comparator is configured to compare a voltage from the voltage divider to a reference voltage.

7. The system according to claim 1, wherein a comparator is configured to determine if the temperature is above a threshold temperature.

8. The system according to claim 1, wherein the network access device is deactivated by disconnecting the power source from the network access device.

9. The system according to claim 1, wherein the network access device is activated by connecting the power source to the network access device.

10. The system according to claim 1, wherein the network access device is activated by an ON signal from the control circuit after the supply power is enabled by an enable signal from the control circuit.

11. A control circuit for controlling a network access device, the control circuit comprising:
a controllable power source for the network access device, the controllable power source being coupled to the network access device and configured to provide electrical energy to the network access device responsive to an enable signal received at a control input of the controllable power source;
a temperature sensor connected to the network access device and configured to provide a voltage representative of a temperature of the network access device;
a comparator connected to the temperature sensor and configured to compare the voltage representative of a temperature of the network access device to a reference voltage and provide an enable signal to the control input of the controllable power source if the temperature of the network access device as determined by the temperature sensor is below a predetermined threshold temperature, the comparator being additionally configured to provide a second, disable signal to the control input of the controllable power source if the temperature of the network access device as determined by the temperature sensor exceeds the predetermined threshold; and a processor having an output coupled to the control input of the controllable power source, the processor being configured to re-enable the controllable power source after the controllable power source is disabled by the comparator in order to supply electrical energy to the network access device, thereby enabling the power source to continue to supply electrical energy to the network access device when the signal from the temperature sensor indicates that a temperature of the network access device exceeds the predetermined threshold.

12. The control circuit according to claim 11, wherein the sensor is a thermistor, the thermistor forming a voltage divider, the comparator being configured to compare a voltage from the voltage divider to a reference voltage.

13. A method for controlling a network access device, the method comprising:

monitoring a temperature of the network access device and providing a first signal representing network access device temperature;

comparing the first signal to a second signal, which represents a threshold temperature, the comparing step being performed by a comparison circuit; and controlling power to the network access device based on the temperature, the step of controlling power to the network access device comprising:

disabling power to the network access device by the comparison circuit when the first signal exceeds the second signal;

and, when the first signal exceeds the second signal, selectively re-enabling power to the network device using a processor coupled to a power source for the network access device.

14. In a computer readable storage medium having stored therein instructions executable by a programmed processor for controlling a network access device, the storage medium comprising instructions for:

monitoring a temperature of the network access device with a control circuit;

comparing the temperature with a threshold temperature;

stopping power to the network access device by the control circuit based on the temperature as determined by the control circuit; and when power to the network access device has been stopped by the control circuit, selectively re-supplying power to the network access device by a processor while the temperature of the network access device exceeds the threshold temperature.

* * * * *